United States Patent [19]

Airoldi

[11] Patent Number: 5,520,107
[45] Date of Patent: May 28, 1996

[54] PRINTING MACHINE FOR PRINTING OBJECTS LIABLE TO BE STACKED

[75] Inventor: Frédéric Airoldi, Servon, France

[73] Assignee: Societe d'Exploitation des Machines Dubuit, Noisy le Grand, France

[21] Appl. No.: 358,453

[22] Filed: Dec. 19, 1994

[30] Foreign Application Priority Data

Jan. 7, 1994 [FR] France .................................. 94 00129

[51] Int. Cl.[6] ...................................................... B41F 17/00
[52] U.S. Cl. ............................ 101/35; 101/476; 101/115; 414/493; 414/494
[58] Field of Search ..................................... 101/115, 126, 101/35–37, 123, 171, 211, 238, 240, 474, 476; 414/793, 797, 788.4

[56] References Cited

U.S. PATENT DOCUMENTS

| | | | |
|---|---|---|---|
| 4,720,227 | 1/1988 | Eberle | 414/788.4 |
| 5,158,016 | 10/1992 | DuBuit | 101/123 |
| 5,165,340 | 11/1992 | Karlyn et al. | 101/126 |
| 5,402,718 | 4/1995 | Rigodiat | 101/115 |
| 5,429,045 | 7/1995 | Karlyn et al. | 101/35 |
| 5,456,169 | 10/1995 | Rohwetter et al. | 101/35 |

*Primary Examiner*—Eugene H. Eickholt
*Attorney, Agent, or Firm*—Young & Thompson

[57] ABSTRACT

A printing machine for printing objects liable to be stacked includes a circular printing table having a plurality of object stations regularly distributed at its perimeter each adapted to receive an object to be printed. By stepwise rotation about an axis, it moves the object stations successively to a loading station, to a plurality of workstations each including a printing system, and to an offloading station. A loading system at the loading station includes a presentation device which moves at least one stack of objects to the loading station and a transfer device operative between the presentation device and the printing table and equipped with at least one pick-up unit adapted to pick up an object from the stack on the presentation device and then to put this object down on one of the object stations of the printing table. The loading system of each transfer device includes two presentation devices and the transfer device includes at least one pair of pick-up units disposed side by side and successively cooperating with respective presentation devices.

13 Claims, 2 Drawing Sheets

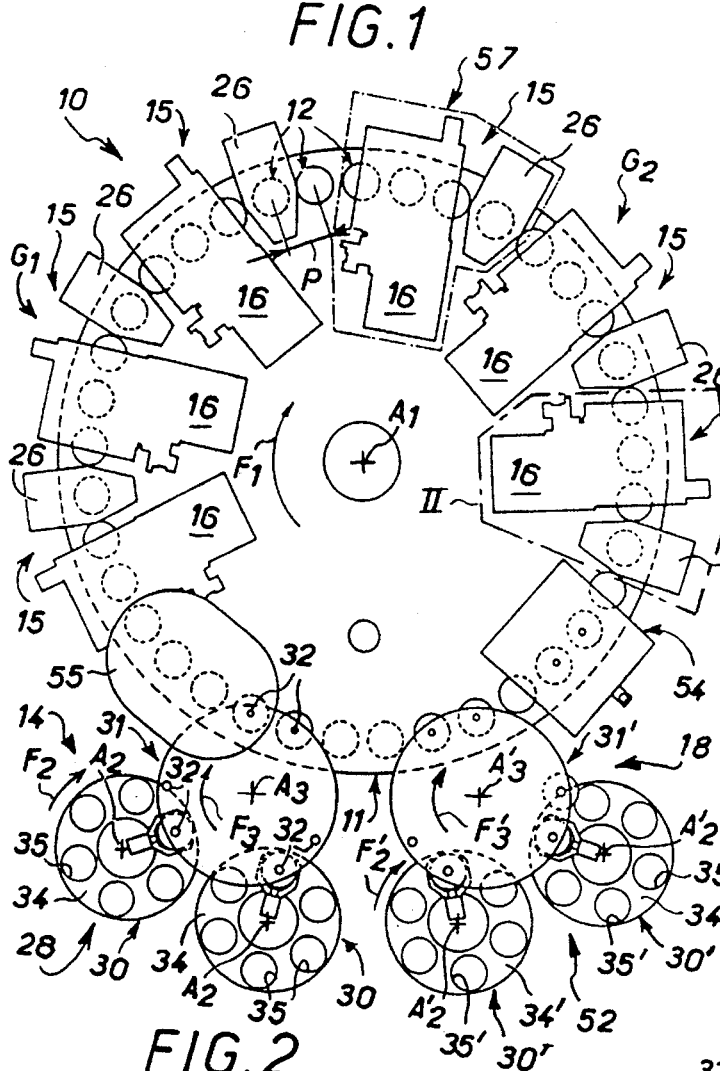
FIG.1
FIG.2
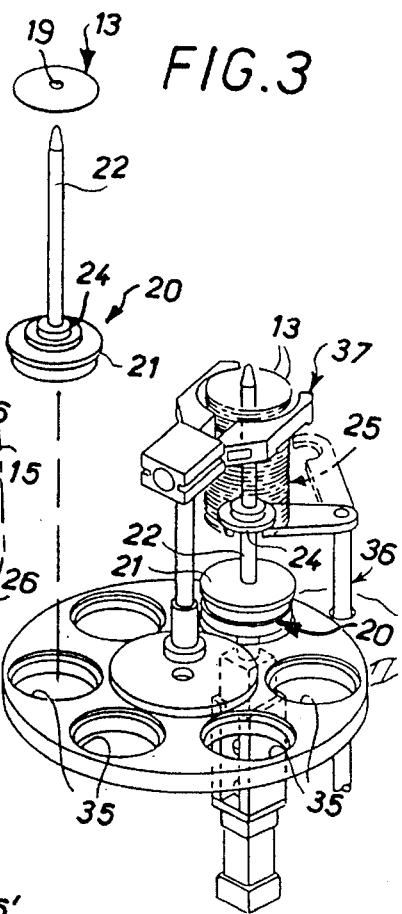
FIG.3
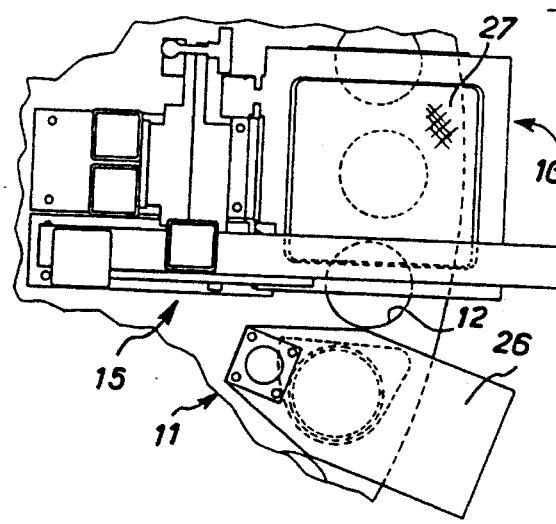
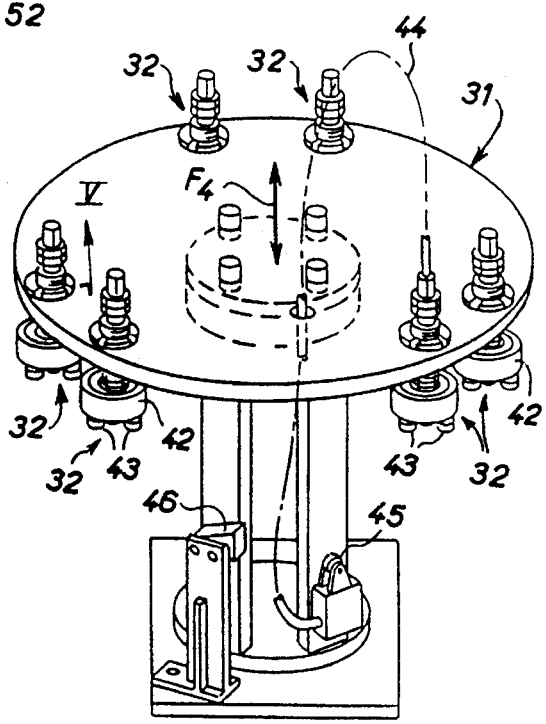
FIG.4

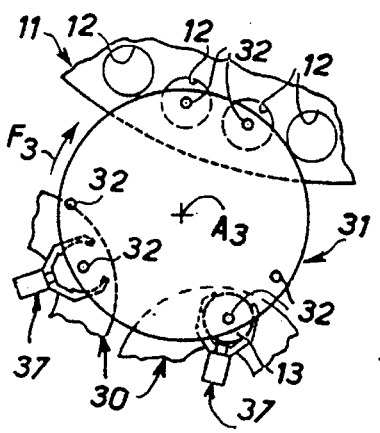
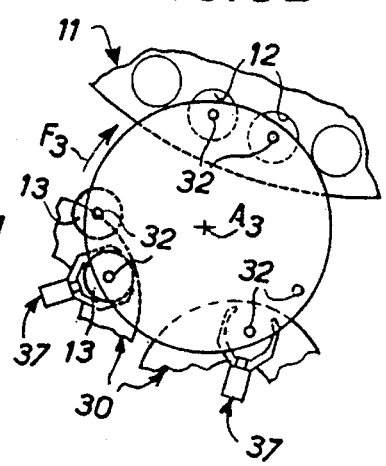
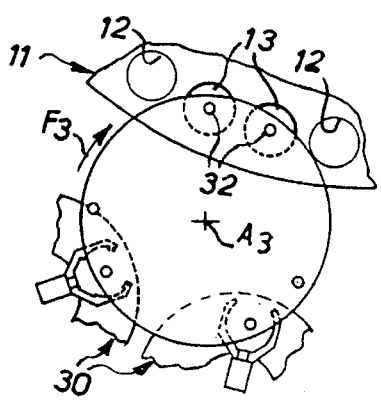
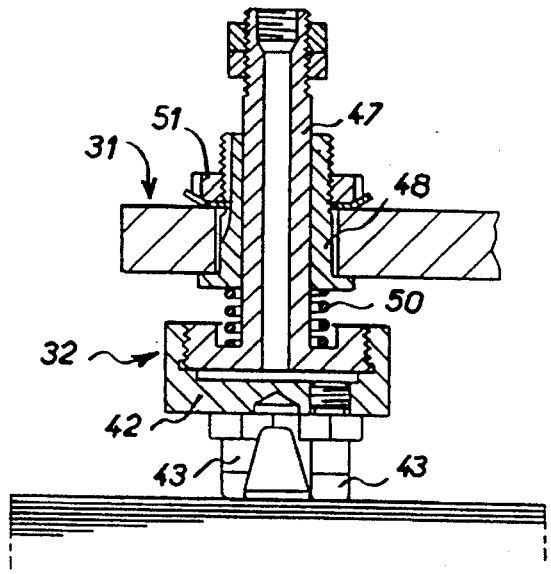
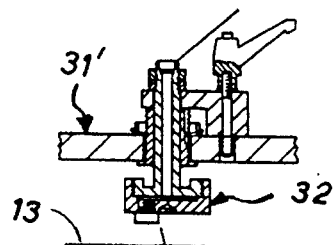
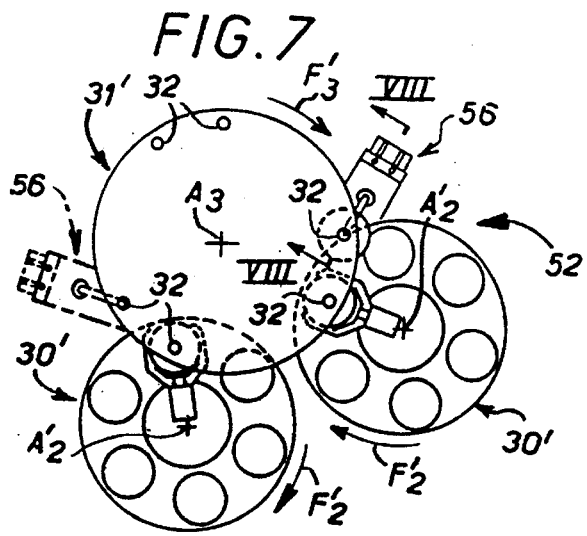
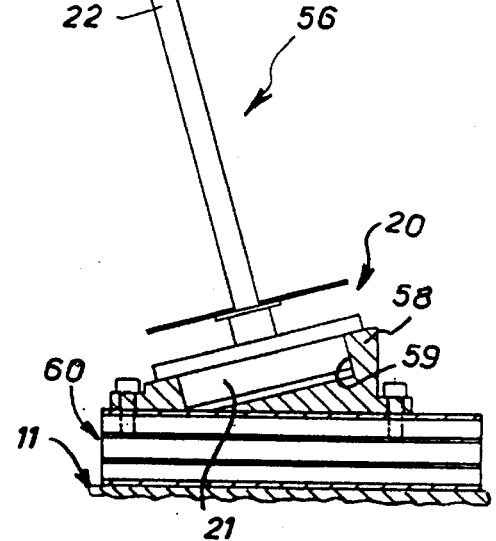

PRINTING MACHINE FOR PRINTING OBJECTS LIABLE TO BE STACKED

BACKGROUND OF THE INVENTION

1. Field of the Invention

The present invention relates generally to printing objects that are liable to be stacked.

This is the case with compact discs, for example.

2. Description of the Prior Art

The present invention relates more particularly to the situation in which the printing machine used to print such objects includes a circular printing table with regularly spaced around its perimeter a plurality of object stations each adapted to receive an object to be printed and which rotates stepwise about a vertical axis to move the object stations in succession to a loading station, to a plurality of workstations each including printing means, and to an offloading station; a loading system at the loading station includes a presentation device adapted to move to the loading station at least one stack of objects and a transfer device which, operating between the presentation device and the printing table, has at least one pick-up unit by means of which it picks up an object from the stack on the presentation device and then puts this object down at one of the object stations of the printing table.

In practise there is usually one workstation for each colour to be printed and at the loading station the transfer device of the loading system picks up the objects to be printed from the presentation device one by one and puts them down on the printing table one by one.

The production throughput of the system is therefore determined by that of the loading system.

A general object to the present invention is a system enabling the production throughput to be doubled and which also has other advantages.

SUMMARY OF THE INVENTION

To be more precise, the invention consists in a printing machine for printing objects liable to be stacked including a circular printing table having a plurality of object stations regularly distributed at its perimeter each adapted to receive an object to be printed and, by stepwise rotation about an axis, successively to move said object stations to a loading station, to a plurality of workstations each including printing means, and to an offloading station, a loading system at said loading station including a presentation device adapted to move to said loading station at least one stack of objects and a transfer device operative between said presentation device and said printing table and equipped with at least one pick-up unit adapted to pick up an object from the stack on said presentation device and then to put this object down on one of said object stations of said printing table, in which machine said loading system of each transfer device includes two presentation devices and said transfer device includes at least one pair of pick-up units disposed side by side and successively cooperating with respective presentation devices.

The transfer device thus picks up an object to be printed from each of the presentation devices in succession and then puts down simultaneously on the printing table both objects to be printed that it has just picked up in this way.

Assuming that the number of workstations is an even number 2N, it is therefore advantageously possible in a double production mode to print N colours during the same rotation of the printing table, half of the workstations successively printing the same object whilst the other half of the workstations simultaneously print another object.

The production rate of the system is thus doubled, to the benefit of overall productivity.

Assuming that the number of object stations on the printing table is odd while the footprint of each workstation corresponds to an even number of object stations, an alternative embodiment of printing machine of the invention advantageously enables, in a single production mode, printing of 2N colours in succession on the same object, using the 2N workstations during two successive rotations of the printing table.

This halves the production rate as compared with the first embodiment, but gives the printing machine of the invention the advantage of great flexibility of adaptation to different printing conditions, for example according to the number of objects to be printed during the same series and/or the number of colours to be printed on the objects.

This flexibility is further increased if, in accordance with a further feature of the inventions, the fact that there is an odd number of object stations on the printing table is exploited, since there is inevitably at least one free object station around the printing table between two groups of workstations.

In accordance with this feature of the invention, at least one workstation is carried by a plate which, at the aforementioned free workstation, is mounted for circular adjustment of its position about the rotation axis of the printing table.

Thus it is advantageously possible to include this workstation in either of the groups of workstations separated by the free object station and so to modulate the number of workstations included in each group and therefore the number of colours (or more generally the number of printing impressions) that can be applied to either of two separate series of objects in the double production mode of operation.

In practise the offloading station uses an offloading system of similar construction to the loading system, the offloading system including a transfer device and, associated with the latter in the double production mode of operation, two evacuation devices of the same type as the presentation devices of the loading system and each adapted to accumulate at least one stack of objects and to remove the latter from the offloading station.

Using a process similar to that previously described for the loading station, the transfer device simultaneously picks up from the printing table two objects already printed and normally releases one at one of the evacuation devices and the other at the other of the latter.

In accordance with a further feature of the invention this feature is further exploited, outside the normal evacuation process, to release certain printed objects prematurely or late, to eliminate from the normal treatment process all objects on which the printing is defective.

To enable this, the offloading system of the printing machine of the invention preferably includes, in addition to the evacuation devices, at least one additional collection unit.

This is, for example, simply a static stack support near one of the evacuation devices, either on the upstream side of the first of the latter or on the downstream side of the second.

Objects whose printing is defective are simply released at this location under the control of a control station which actuates the pick-up unit holding them accordingly.

The features and advantages of the invention will emerge from the following description given by way of example and with reference to the appended diagrammatic drawings.

BRIEF DESCRIPTION OF THE DRAWINGS

FIG. 1 is a plan view of a printing machine in accordance with the invention.

FIG. 2 shows to a larger scale the part of figure 1 identified by a frame II in FIG. 1.

FIG. 3 is an exploded perspective view to a still larger scale of an object to be printed, a stack support adapted to receive this type of object and a presentation device adapted to receive this type of stack support.

FIG. 4 is a perspective view of the corresponding transfer device to substantially the same scale as FIG. 3.

FIG. 5 shows part of the transfer device in transverse station on the line V—V in FIG. 4 and to a larger scale.

FIGS. 6A, 6B, 6C are plan views repeating part of FIG. 1 and showing various phases in the operation on the printing machine of the invention.

FIG. 7 is a plan view, also repeating part of FIG. 1 and relating to an alternative embodiment of the invention.

FIG. 8 is a view of part of this embodiment of the invention in transverse section on the line VIII—VIII in FIG. 7 and to a larger scale.

DETAILED DESCRIPTION OF THE PREFERRED EMBODIMENTS

Referring to FIG. 1, the printing machine 10 of the invention includes a circular printing table 11 having regularly distributed around its perimeter a plurality of object stations 12 each adapted to receive an object 13 to be printed. On rotating stepwise about an axis A1 through its center and perpendicular to its plane, and in practise vertical, it moves the object station 12 in succession to a loading station 14, a plurality of workstations 15 each including printing means 16, and an offloading station 18, for example in the clockwise direction indicated by the arrow F1 in FIG. 1.

The objects 13 to be printed are of any kind, but are liable to be stacked.

In the embodiment shown they are flat objects in practise, to be more precise compact discs with a central opening 19.

Stack supports 20 are used for stacking these objects 13.

Referring to FIG. 3, a stack support 20 includes a base 21, a column 22 attached to the base 21, projecting axially from the latter and pointed at its upper end over which the central opening 19 in the objects 13 is fitted, and a ring 24 sliding on the column 22.

A stack support 20 of this kind is well known in itself and as it does not of itself form any part of the present invention it is not described in detail here.

In use, it carries a stack 25 of objects 13.

In practise, the stack rests on the ring 24.

The printing machine 10 is not described in detail here either.

Only its component parts needed for an understanding of the invention are described.

In the embodiment shown the printing machine 10 has an even number 2N of workstations 15.

This number is equal to 6 in the example shown.

The printing table 11 has an odd number of object stations 12, much larger than the number of workstations 15.

The number of object stations 12 is equal to 37 in the example shown.

Be this as it may, the object stations 12 have a regular pitch P.

The workstations 15 are all identical and, in addition to the printing means 16, each includes drying means 26 on the downstream side of the printing means 16 in the direction of rotation of the printing table 11.

The printing means 16 form a silkscreen printing station, for example.

A silkscreen printing station of this kind being well known in itself, suffice to say that it includes a silk screen 27, a squeegee, not visible in the figures, adapted to push over the screen 27 the ink which is adapted to pass through it, and control means for displacement of the squeegee along the screen 27, lifting it relative to the latter and also lifting the screen 27.

The drying means 26 comprise an ultra violet oven, for example.

In practise, the footprint of a workstation 15 on the printing table 11 corresponds to an even number of object stations 12.

In the example shown this number is equal to 4, the printing means 16 subtending an angle equivalent to three object stations 12 and therefore equal to three pitches P and the drying means 26 subtend an angle equivalent to one object station 12 and therefore equal to one pitch P.

As a result, the workstations 15 are divided into two groups G1 and G2 separated by one pitch P, which is occupied by a free object station 12.

In the embodiment shown each group G1, G2 includes the same number N of workstations 15. In this example N is equal to 3.

A loading system 28 at the loading station 14 includes, firstly, in a manner that is known in itself, a presentation device 30 which is adapted to move to the loading station 14 at least one stack 25 of objects 13 on a stack support 20 and, secondly, a transfer device 31 operative between the presentation device 30 and the printing table 11 and having at least one pick-up unit 32 adapted to pick up an object 13 from the top of the stack 25 on a presentation device 30 and then to put that object 13 down at one of the object stations 12 of the printing table 11.

The presentation device 30 includes a circular plate 34 which rotates stepwise about an axis A2 parallel to the rotation axis A1 of the printing table 11, for example in the clockwise direction indicated by the arrow F2 in FIG. 1. It has a plurality of circumferentially distributed object stations 35 each adapted to receive a stack support 20.

In a manner that is not described in detail here, the presentation device 30 further includes, in the embodiment shown, a device 36 for raising the stack 25 in steps as objects 13 are picked up from it, through the intermediary of the ring 24 on which the stack 25 rests, and a retaining device 37 for retaining a reserve of objects 13 during a change of stack support 20 by virtue of the plate 34 moving on one step.

The transfer device 31 includes a circular plate which rotates stepwise about an axis A3 parallel to the rotation axis A1 of the printing table 11, for example in the clockwise direction indicated by the arrow F3 in FIG. 1. It is reciprocated vertically relative to the printing table 11, as indicated by the double-headed arrow F4 in FIG. 4.

The locations of the rotation axes A1, A2, A3 are shown in the figures.

Stepwise control of the presentation device 30 and the transfer device 31 is based on the use of indexing devices (not shown), for example, synchronously with control of the printing table 11.

These arrangements are well known in themselves and as they are not directly relevant to the present invention they are not described here.

In accordance with the invention, the loading system 28 of each transfer device 31 includes two presentation devices 30 disposed side by side at the periphery of the transfer device 31 and in practise identical to each other. The transfer device 31 includes at least two pairs of pick-up units 32 disposed side by side at the periphery of the transfer device 31 and cooperating successively with respective presentation devices 30.

As shown in FIGS. 6A, 6B, the pick-up unit 32 of the same pair which is the leading device in the direction of rotation of the transfer device 31 cooperates with the first presentation device 30 in this same direction of rotation (FIG. 6A) and the trailing pick-up unit 32 cooperates with the second presentation device 30 (FIG. 6B).

In other words, the transfer device 31 is lowered so that the first pick-up unit 32 picks up an object 13 from the first presentation device 30, in line with the retaining device 37 of the latter (FIG. 6A), and then, after it is raised and advanced by one step, it is lowered again so that the second pick-up unit 32 picks up an object 13 from the second presentation device 30, in line with the retaining device 37 of the latter (FIG. 6B).

After it is raised and again advanced by one step, the transfer device 31 puts both objects 13 it has previously picked up down at the same time on the printing table 11, as shown diagrammatically in FIG. 6C.

It will have been noted that on picking up the first object 13 the second pick-up unit 32 does nothing and that on picking up the second object 13, the object previously picked up remains suspended from the pick-up unit 32 which picked it up, without having anything done to it.

In practise the transfer device 31 has a plurality of pairs of pick-up units 32 distributed circumferentially.

In the embodiment shown it has three pairs of pick-up units 32 at 120°, and each stepwise advance therefore corresponds to a rotation of 120°.

In the embodiment shown the pick-up units 32 are suction devices.

To this end each includes (FIGS. 4 and 5) a head 42 with a plurality of suction nozzles 43 equi-angularly distributed about its axis on its lower surface. There are three nozzles 43, for example. It communicates with a pipe 44 so that it can be connected to a suction pump (not shown).

In each pick-up unit 32 the pipe 44 is under the control of a valve 45 which is operated as it moves past a fixed cam 46.

In practise, the head 42 is carried by a rod 47 sliding in a bush 48 carried by the transfer device 31 (see FIG. 5), and is urged downwards at all time by spring means 50 such as a simple coil spring which bears against the bush 48.

The rod 47 has a shoulder in the example shown and is clamped to the transfer device 31 by a nut 51.

It is hollow to connect the suction nozzles 43 to the associated pipe 44.

The printing machine 10 of the invention further includes, at the offloading station 18, an offloading system 52 of similar construction to the loading system 28 at the loading station 14.

The offloading system 52 thus includes a transfer device 31' with pick-up units 32 and two associated evacuation devices 30' each adapted to accumulate at least one stack 25 of objects 13 and to remove the latter from the offloading station 18.

The transfer device 31' is in all respects similar to the transfer device 31 of the loading station 14.

It rotates stepwise about a vertical axis A'3 in the clockwise direction indicated by the arrow F'3 in FIG. 1.

Similarly, the evacuation devices 30' are similar to the presentation device 30.

They thus include a circular plate 34' rotating stepwise about a vertical axis A'2 in the clockwise direction indicated by the arrow F'2 in FIG. 1 and each has a plurality of circumferentially distributed object stations 35' each adapted to receive a stack support 20.

On the upstream side of the loading station 14, between the latter and the last workstation 15, a control station 54 checks the printing done, using video cameras, for example.

The embodiment shown also includes a control station 55 between the loading station 14 and the first workstation 15 to check that the objects 13 are those expected, for example by reading a serial number.

The step by which the printing table 11 is advanced is equal to twice the pitch P between two of its object stations 12.

For the double production mode of operation, the two presentation devices 30 of the loading system 28 and the two evacuation devices 30' of the offloading system 52 are in service.

By the process previously described, the objects 13 to be printed are put down two by two on the printing table 11 and, by a similar process, they are removed therefrom two by two after printing.

The even-numbered objects 13 are printed successively at each workstation 15 of the first group G1. The odd-numbered objects 13 are printed successively at each workstation 15 of the second group G2.

All are printed during a single rotation of the printing table 11.

They can be treated differently in the two groups G1, G2 of workstations 15, however.

In other words, with the printing machine 10 of the invention it is possible to treat simultaneously and in parallel two series of objects 13, the objects of one series receiving a first type of printing and those of the other a second type of printing which can be different from the first type.

Alternatively, for six-colour printing, for example, and therefore in the single production mode of operation, one only of the presentation devices 30 of the loading system 28 and one only of the evacuation devices 30' of the offloading system 52 are in service.

During a first rotation of the printing table 11 the successive objects 13 receive one colour, or more generally one printing impression, at each workstation 15 of the first group G1. During a second rotation of the printing table 11 they then receive in succession one colour, or more generally one printing impression, at each workstation 15 of the second group G2.

It goes without saying that the distribution of the workstations 15 between the two groups G1, G2 can be different from that shown and described (3+3).

To change this distribution, as shown diagrammatically in chain-dotted outline for one of them in FIG. 1, at least one of the workstations 15 is carried by a plate 57 whose angular position about the rotation axis A1 of the printing table 11 can be adjusted.

In FIG. 1 this applies to one of the workstations 15 adjoining the free object station 12 of the printing table 11.

It is therefore possible to change from a 3+3 distribution for the two groups G1, G2 of workstations 15 to a 4+2 distribution.

All that is required is to pivot the mobile workstation 15 one pitch P about the rotation axis A1.

To generalize this disposition and, for example, for a 5+1 distribution between the two groups G1, G2 of workstations 15, all or some of the workstations 15 can be individually carried in this way by a plate 57 whose angular position about the rotation axis A1 of the printing table 11 can be adjusted.

Each time, it is possible to print two series of objects simultaneously, in the double production mode of operation, the objects of one series receiving a number of printing impressions equal to the number of workstations 15 in the group G1 and the objects of the other series receiving a number of printing impressions equal to the number of workstations 15 in the group G2.

In the double production mode of operation, and by means of a process similar to the loading process as already described, the transfer device 31' of the offloading system 52 first puts down a first object 13 at the first evacuation device 30' before putting down the second at the second of the latter.

When the first object is put down the second remains suspended from the pick-up unit 32 holding it without anything being done to it and, when the second object is put down, the pick-up unit 32 previously holding the first object does nothing.

In the embodiment of the invention shown in FIGS. 7 and 8 this feature is exploited to achieve early or late offloading of objects 13 whose printing has been found to be defective, under the control of the control station 54, which operates the valves 45 concerned accordingly.

To eliminate such objects 13 the offloading system 52 includes at least one collection unit 56 in addition to the evacuation devices 30', as shown in FIG. 7.

In the embodiment shown in full line the collection unit 56 is on the upstream side of the first evacuation device 30' in the direction of rotation of the transfer device 31'.

Alternatively, however, and as shown in chain-dotted line, it could be on the downstream side of the second evacuation device 30'.

The collection unit 56 is in practise a static stack support 20 near the evacuation device 30' concerned, with the pointed upper end of its column 22 vertically aligned with the pick-up unit 32 which is not normally operative at this evacuation device 30'.

In practise, given the congestion in this area, the column 22 is inclined to the rotation axes A'2, A'3 and therefore to the vertical.

In the example shown the base 21 carrying it is attached to a plate 58 having an inclined housing 59 adapted to receive it.

In the embodiment shown this plate 58 is removably attached to a baseplate 60 attached to the printing table 11 in such a way that its position can be adjusted.

In all cases the objects 13 held by the pick-up units 32 are simply dropped by the latter when, under the control of the respective valve 45, their suction nozzles 43 are vented.

Of course, the invention is not limited to the embodiments described and shown, but encompasses any variant execution thereof.

There is claimed:

1. Printing machine for printing objects liable to be stacked including a circular printing table having a plurality of object stations regularly distributed at its perimeter each adapted to receive an object to be printed and, by stepwise rotation about an axis, successively to move said object stations to a loading station, to a plurality of workstations each including printing means, and to an offloading station, a loading system at said loading station including a presentation device adapted to move to said loading station at least one stack of objects and a transfer device operative between said presentation device and said printing table and equipped with at least one pick-up unit adapted to pick up an object from the stack on said presentation device and then to put this object down on one of said object stations of said printing table, in which machine said loading system of each transfer device includes two presentation devices and said transfer device includes at least one pair of pick-up units disposed side by side and successively cooperating with respective presentation devices.

2. Printing machine according to claim 1 wherein said transfer device is a circular plate adapted to be rotated stepwise about an axis parallel to the rotation axis of said printing table and said pick-up unit which is leading in the direction of rotation cooperates with the first presentation device in the same rotation direction and the trailing pick-up unit cooperates with the second presentation device.

3. Printing machine according to claim 1 wherein said transfer device has a plurality of circumferentially distributed pairs of pick-up units.

4. Printing machine according to claim 3 wherein said transfer device has three pairs of pick-up units at 120°.

5. Printing machine according to claim 1 wherein each presentation device includes a circular plate adapted to be rotated stepwise about an axis parallel to the rotation axis of said printing table and having a plurality of circumferentially distributed object stations each adapted to receive a stack support.

6. Printing machine according to claim 1 including at said offloading station an offloading system similar to said loading system, said offloading system including a transfer device and two associated evacuation devices each adapted to accumulate at least one stack of objects and to remove said stack from said offloading station.

7. Printing machine according to claim 6 wherein to eliminate defective objects said offloading system includes at least one collection unit in addition to said evacuation devices.

8. Printing machine according to claim 7 wherein said collection unit comprises a stack support near an evacuation device.

9. Printing machine according to claim 8 wherein said stack support forming said collection unit includes a column inclined relative to said rotation axes.

10. Printing machine according to claim 7 including a collection unit on the upstream side of the first evacuation device in the direction of rotation of said transfer device and/or a collection unit on the downstream side of the second evacuation device.

11. Printing machine according to claim 1 wherein said printing table has an odd number of object stations and the footprint of each workstation corresponds to an even number of object stations.

12. Printing machine according to claim 11 comprising an even number of workstations.

13. Printing machine according to claim 1 wherein at least one of said workstations is carried by a plate whose angular position about the rotation axis of said printing table is adjustable.

* * * * *